United States Patent [19]
Ashida

[11] Patent Number: 5,336,696
[45] Date of Patent: Aug. 9, 1994

[54] HALOGEN-FREE BLOWING AGENTS THAT INCLUDE CYCLOALIPHATIC HYDROCARBONS AND ARE SUITABLE FOR ISOCYANATE-BASED POLYMERIC FOAMS

[75] Inventor: Kaneyoshi Ashida, Farmington Hills, Mich.

[73] Assignee: Nisshinbo Industries, Inc., Japan

[21] Appl. No.: 165,362

[22] Filed: Dec. 10, 1993

[51] Int. Cl.⁵ ............................................. C08G 18/14
[52] U.S. Cl. .................................. 521/113; 521/114; 521/130; 521/131
[58] Field of Search ................. 521/113, 114, 130, 131

[56] References Cited

U.S. PATENT DOCUMENTS

| | | | |
|---|---|---|---|
| Re. 30,676 | 7/1981 | Mori et al. | 521/110 |
| 3,558,531 | 1/1971 | Salyer et al. | 250/2.5 |
| 3,625,872 | 12/1971 | Ashida | 260/2.5 |
| 3,793,236 | 2/1974 | Ashida et al. | 521/159 |
| 3,879,315 | 4/1975 | Watkinson et al. | 521/159 |
| 4,055,521 | 10/1977 | Taub et al. | 252/350 |
| 4,898,893 | 2/1990 | Ashida | 521/131 |
| 5,057,547 | 10/1991 | Doerge | 521/131 |
| 5,079,271 | 1/1992 | Gillis | 521/125 |
| 5,091,436 | 2/1992 | Frisch et al. | 521/137 |
| 5,102,920 | 4/1992 | Doerge et al. | 521/131 |
| 5,120,770 | 6/1992 | Doyle et al. | 521/99 |
| 5,166,182 | 11/1992 | Blanpied | 521/50 |
| 5,283,003 | 2/1994 | Chen | 521/131 |

FOREIGN PATENT DOCUMENTS 1511865 12/1967 France.

OTHER PUBLICATIONS

Kam, Chem. Eng. Science 48 (12)2307–2312 (1993).
Doerge et al., 33rd Annual Polyurethane Technical/Marketing Conference, Sep. 30–Oct. 3, 1990, pp. 82–89.
Heilig et al., Proceedings of International Polyurethane Forum, Nagoya, Japan, May 10–12, 1993, pp. 197–201.

*Primary Examiner*—Maurice J. Welsh
*Attorney, Agent, or Firm*—Olson & Hierl, Ltd.

[57] ABSTRACT

A halogen-free blowing agent is used to produce isocyanate-based polymeric foams. The blowing agent is an organic liquid which is free from halogens and contains a positive binary azeotrope having a minimum boiling temperature in the range of about 15° C. to about 80° C. at normal atmospheric pressure. Particularly preferred is a binary azeotrope of an alicyclic hydrocarbon such as cyclopentane or cyclohexane and methyl formate.

The halogen-free blowing agents contemplated herein provide the following advantages: no ozone depletion potential, no global warming potential, direct replacement in foam formulations for trichloromonofluoromethane (CFC-11), relatively higher blowing action, relatively lower foam density, relatively lower thermal conductivity, better compatibility, and relatively lower materials cost.

34 Claims, 3 Drawing Sheets

FIG. 6

HALOGEN-FREE BLOWING AGENTS THAT INCLUDE CYCLOALIPHATIC HYDROCARBONS AND ARE SUITABLE FOR ISOCYANATE-BASED POLYMERIC FOAMS

FIELD OF THE INVENTION

This invention relates to the manufacture of isocyanate based polymeric foams using a halogen-free azeotrope of specific type as a blowing agent.

BACKGROUND OF THE INVENTION

Polymeric foams are made using a blowing agent that generates a cellular structure as polymerization of reactants takes place. Trichloromonofluoromethane (CFC-11) has been the most often used physical blowing agent for various isocyanate-based polymeric foams, such as polyurethane foams, polyisocyanurate foams, polyurea foams, and polyamide foams, the hybrid foams, as well as for thermoplastic foams, e.g., polystyrene foams, polyethylene foams, polypropylene foams and phenolic foams.

However, due to the well-recognized ozone depletion problem in the stratosphere, all kinds of chlorofluorocarbons (CFCs) must be phased out by the end of 1995 according to a worldwide regulation. To achieve that end, some CFC-free, alternative physical blowing agents have been developed in recent years, albeit with limited success.

Chemical (or reactive) blowing agents such as water, which generates carbon dioxide gas by the reaction with isocyanate groups, constitute one class of such CFC-free blowing agents. However, water has the following disadvantages as the blowing agent for rigid foams: a relatively high exotherm which may cause scorching, high system viscosity, higher K-factor, poor adhesion to metal substrates due to thinner skin formation, lower dimensional stability (shrinkage), etc. In the case of flexible foams, disadvantages of water as a blowing agent include: relatively high exotherm which may cause discoloration and possible fire risk, and higher system viscosity. Furthermore, integral skin foam preparation is very difficult with such blowing agents, and therefore specific, costly polyols are required.

Other chemical blowing agents include enolizable compounds (K. Ashida, *International Progress in Urethanes*, Eds., Ashida, K. Frisch, K.C., Technomic Publishing Co., Inc. [1980], p. 153), polycarboxylic acids (U.S. Pat. No. 5,057,547 to Doerge), specific aldehydes or ketones (U.S. Pat. No. 5,079,271 to Gillis).

Physical (or non-reactive) blowing agents constitute another class of alternative blowing agents. Such physical blowing agents exhibit ozone depletion potential (ODP) and include the HCFCs (hydrochlorofluorocarbons, e.g., HCFC 141b, $CCl_2FCH_3$), the HFCs (hydrofluorocarbons, e.g., HFC-35b, $C_4H_4F_6$), the PFCs (pefluorohydrocarbons, e.g., PF-5050, $C_5F_{12}$) and the HFCEs (hydrofluorocarbon ethers, e.g., E-245, $CF_3CH_2OCH_3$). A physical blowing agent performs a blowing action by the exothermic reaction of polymer formation. Therefore, the lower the boiling point of the blowing agent, the lower the resulting foam density for the same mole amount of blowing agent. In order to obtain low density foams, a low boiling point liquid is desired. In addition, their raw materials costs are higher than those of other alternative blowing agents, and therefore, their potential for commercial applications is questionable.

Recently, n-pentane and cyclopentane have been used in European countries as physical blowing agents for rigid urethane foams (see, for example, E.E. Ball, Proceedings of the Polyurethanes World Congress 1993, Vancouver, Canada, Oct. 10-13, 1993, p. 10). However, due to their non-polarity or relatively low compatibility with other ingredients, special foaming formulations are required for this application.

Methylene chloride is another widely used blowing agent for flexible urethane foams, usually as a co-blowing agent with water. However, it is not suitable for use with rigid urethane foams due to a variety of processing problems, e.g., foam collapse or coarse cell foams. Therefore, no commercial applications have been reported to date.

A blend of methylene chloride and pentane also has been used for polyisocyanurate foam preparation (U.S. Pat. No. 4,898,893 to Ashida). However, this blowing agent encounters problems in preparation of rigid polyurethane foams, such as foam collapse, coarse cells, or open cell structure. Another type of physical blowing agent that has been used is liquid carbon dioxide (U.S. Pat. No. 5,120,770 to Doyle et al.). This blowing agent has a disadvantage in that a high pressure foaming equipment is required.

The use of acetone/cyclopentane combinations having a cyclopentane:acetone volume ratios between 85:15 and 60:40 as a blowing agent for rigid urethane foams is shown in U.S. Pat. No. 3,558,531 to Solyer. However, the obtained foam densities are undesirably higher than those of CFC-11 blown foams. Also known as blowing agents are halogen-containing azeotropes such as 2-methylbutane and HCFC141b (1,1-dichloro-1-fluoroethane), mentioned in U.S. Pat. No. 5,057,547 to Doerge, and such as trichlorofluoromethane and methyl formate disclosed in Proceedings of SPI 33rd annual Polyurethane Technical/Marketing Conference, Sept. 30–Oct. 3, 1990, p. 82. However, these latter two kinds of azeotrope contain halogens and thus have the drawback of presenting an ODP problem as well.

SUMMARY OF THE INVENTION

A halogen-free blowing agent that includes a cycloaliphatic hydrocarbon is used in the production of isocyanate-based polymeric foams. The foams are produced with concurrent foaming of reactants by the action of an organic liquid which is a positive azeotrope having a minimum boiling temperature in the range of about 15° C. to about 80° C. at normal atmospheric pressure. The azeotropic component blend ratio of the organic liquid usually is in a range of about ±20 weight percent from that of an ideal azeotrope, but the range can be wider. Foam formulations previously used with trichloromonofluoromethane (CFC-11) are well suited for practicing the present invention.

By the use of halogen-free blowing agent, the present invention offers the advantages of zero ozone depletion potential (ODP), zero global warming potential (GWP), and compared to CFC-11, a relatively higher blowing efficiency as well as a relatively lower raw material cost. Furthermore, the azeotropes contemplated by the present invention as blowing agents provide foams having relatively lower thermal conductivity than the foams blown with the respective individual components of the azeotrope.

The contemplated halogen-free blowing agents contain positive azeotropes constituted by a least two compounds one of which is a cycloaliphatic hydrocarbon containing at least 5 but no more than 7 carbon atoms and the other is a member of the group consisting of an aliphatic ether containing 4 carbon atoms, an aliphatic carboxylic acid ester containing at least 2 but no more than 5 carbon atoms, an aliphatic ketone containing 4 carbon atoms, and mixtures thereof.

DESCRIPTION OF PREFERRED EMBODIMENTS

The isocyanate-based polymeric foams can be polyurethane foams, polyisocyanurate foams, polyurea foams, polyoxazolidone foams, and the like, prepared according to formulations and processing techniques well known in the art. For example, polyurethane foams are made by the reaction of a polyisocyanate with a polyol as foaming ingredients that are foamed concurrently by the action of a blowing agent.

The present invention contemplates the use of halogen-free organic liquids as physical blowing agents for the aforementioned isocyanate based polymeric foams. These organic liquids contain positive azeotropes that have a minimum boiling temperature in the range of about 15° C. to about 80° C. at normal atmospheric pressure. Boiling points below about 15° C. are undesirable because they cause handling problems during processing, e.g., material loss by evaporation due to relatively higher vapor pressure. Boiling points in excess of about 80° C. reduce blowing efficiency and may cause undesirably high density. A minimum boiling temperature in the range of about 15° C. to about 45° C. at normal atmospheric pressure is preferred. Particularly preferred minimum boiling temperature at normal atmospheric pressure is in the range of about 20° C. to about 40° C.

The halogen-free blowing agent contemplated by the present invention is an organic liquid constituted by compounds that together form a positive azeotrope, that is, a minimum boiling azeotrope. The compounds that together form the desired azeotrope are a cycloaliphatic hydrocarbon containing at least 5 but no more than 7 carbon atoms and a member of the group consisting of an aliphatic ether containing 4 carbon atoms, an aliphatic carboxylic acid ester containing at least 2 but no more than 5 carbon atoms, an aliphatic ketone containing 4 carbon atoms, and mixtures thereof.

The cycloaliphatic (or alicyclic) hydrocarbon containing at least 5 but no more than 7 carbon atoms can be saturated or unsaturated. Illustrative saturated cycloaliphatic hydrocarbons are cyclopentane, methylcyclopentane, cyclohexane and methylcyclohexane. Illustrative unsaturated cycloaliphatic hydrocarbons are cyclopentene, cyclohexene, and 1,3-cyclohexadiene.

The aliphatic ether containing four carbon atoms can be an open chain ether or a cyclic ether. Illustrative of aliphatic open chain ethers is ethyl ether. Illustrative of aliphatic cyclic ethers is furan.

Illustrative of the aliphatic ketones is 2-butanone (methyl ethyl ketone).

Illustrative of the aliphatic carboxylic acid esters are methyl formate, ethyl formate, methyl acetate and ethyl acetate.

Examples of the ideal azeotrope blend ratios (by weight) and the boiling points thereof are as follows:
cyclopentane/methyl formate = 33.9/66.1 (B.P. = 26° C.),
cyclopentane/methyl acetate = 62.1/37.9 (B.P. = 43.2° C.),
cyclopentene/methyl acetate = 72.3/27.7 (B.P. = 41.7° C.),
cyclopentane/ethyl formate = 45/55 (B.P. = 42° C.),
cyclohexane/2-butanone = 60/40 (B.P. = 73° C.),
cyclohexene/2-butanone = 53/47 (B.P. = 73° C.).

The blend ratio of the blowing agent to be used in the present invention can be within a relatively wide range.

The present process is not restricted to the use of only ideal azeotropes of the type described herein. The weight ratio of the azeotropic constituents in the organic liquid utilized as the blowing agent can be within a deviation range from ideal as wide as about plus or minus 20 percent (+/−20%), and wider. Preferably, the deviation range is no more than about plus or minus 10 percent (+/−10%), more preferably no more than about plus or minus 5 percent (+/−5%) from the ideal azeotrope composition.

Figure 1:
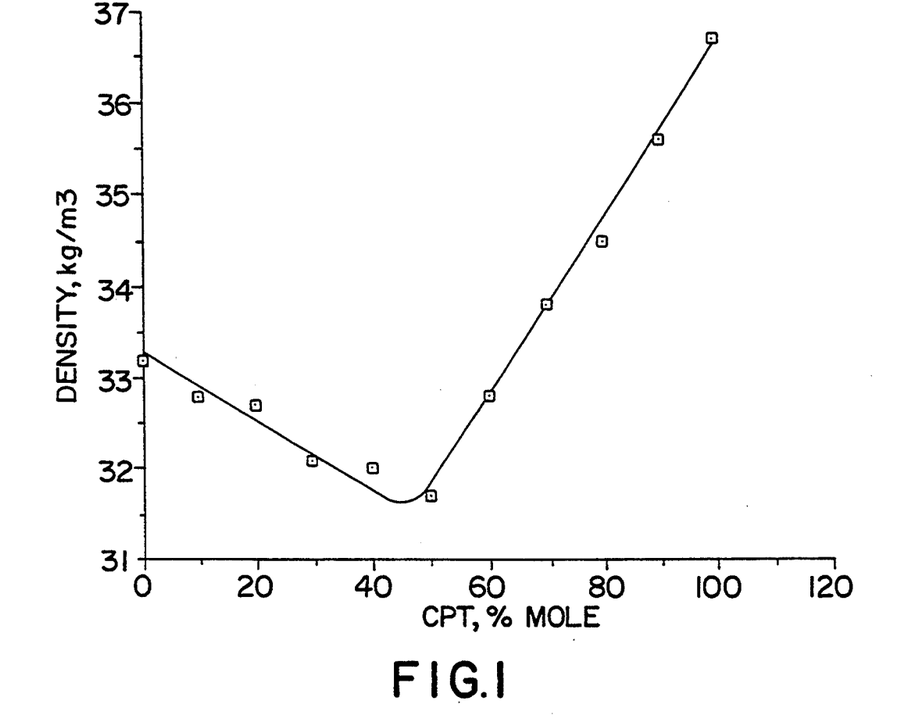
FIG. 1 is a graphical representation of polyurethane foam density as a function of cyclopentane amount when using a cyclopentane (CPT)/methyl formate (MFT) blend as a blowing agent.
Figure 2:
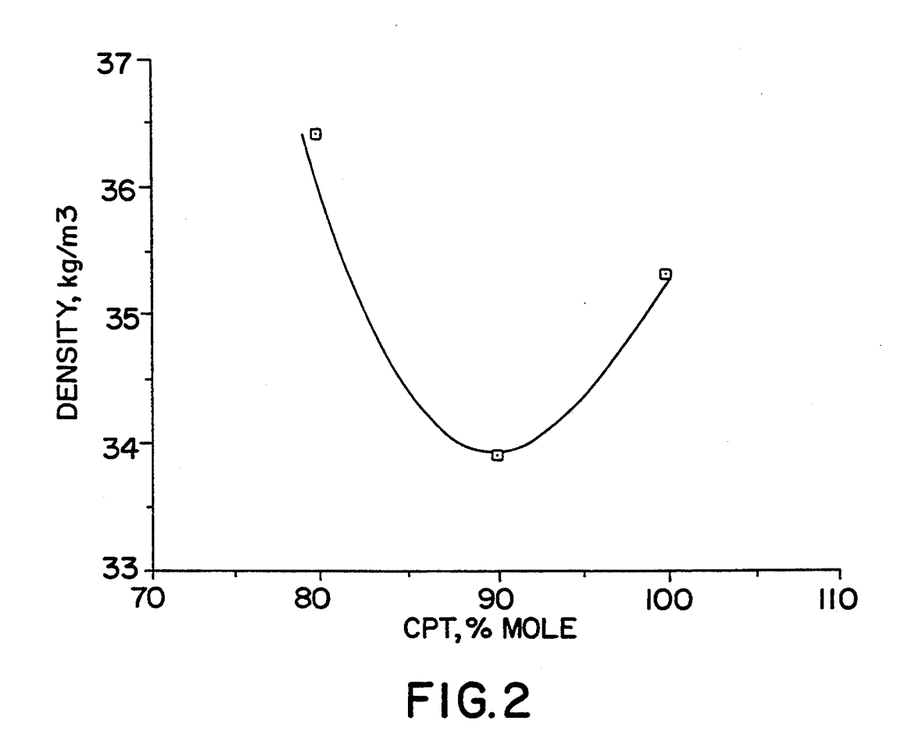
FIG. 2 is a graphical representation of polyurethane foam density as a function of cyclopentane amount when using a cyclopentane (CPT)/methyl ethyl ketone (MEK) blend as a blowing agent.

For example, while in the case of the cyclopentane/methyl formate azeotrope, the ideal azeotropic blend ratio is 33.9/66.1, for use as a blowing agent for foam preparation the blend ratio can be, respectively, as wide as 14/86 to 54/46, preferably 24/76 to 44/56, more preferably 29/71 to 39/61 as illustrated in FIG. 1.

Examples of specific binary azeotropes contemplated for use as blowing agents for practicing the present invention are:
cyclopentane/methyl formate
cyclopentane/ethyl formate
cyclopentane/methyl acetate
cyclopentane/2-butanone
cyclopentane/furan
cyclopentane/tetrahydrofuran
cyclopentane/ethyl ether
cyclopentene/methyl formate
cyclopentene/ethyl formate
cyclopentene/methyl acetate
cyclopentene/2-butanone
cyclopentene/furan
cyclopentene/tetrahydrofuran cyclopentene/ethyl ether
methylcyclopentane/ethyl acetate
cyclohexane/methyl formate
cyclohexane/ethyl formate
cyclohexane/methyl acetate
cyclohexane/ethyl acetate
cyclohexane/2-butanone
cyclohexane/furan
cyclohexane/tetrahydrofuran
cyclohexane/ethyl ether
cyclohexene/methyl formate
cyclohexene/ethyl formate
cyclohexene/methyl acetate
cyclohexene/2-butanone
cyclohexene/furan
cyclohexene/tetrahydrofuran
cyclohexene/ethyl ether
methylcyclohexane/2-butanone
1,3-cyclohexadiene/ethyl acetate The advantages of the use of azeotropic and/or azeotrope-containing blend solvents as the blowing agent for isocyanate based polymeric foams as contemplated by the present invention are as follows:

(1) The azeotrope to be used has a minimum boiling point and thus gives more efficient blowing action; therefore, relatively lower density foams can be obtained. That the azeotrope provides the relatively lower foam density is demonstrated, inter alia, in FIG. 1 for cyclopentane/methyl formate blends.

(2) The azeotrope blowing agents have proper polarity, and result in better compatibility with foaming ingredients; therefore, finer cell foams can be obtained than by the use of a single alkane blowing agent. Polarity extremes of individual blowing agent components can be balanced and, as a result, foam cell structure is improved.

(3) Due to the similarity of boiling point and/or polarity of the azeotrope with that of CFC-11, the azeotrope can directly replace CFC-11 without any change in the conventional raw materials for CFC-11 based formulations. Special formulation studies to effect such substitution are not needed. This is a significant commercial advantage and saves system development costs as well as time. For example, integral skin foams are widely used for automotive interior parts. Due to the ODP problem, these foams are now prepared using water as a blowing agent with expensive, special raw materials and special facilities. The use of the azeotrope blowing agent in accordance with the present invention in conventional integral skin formulations provides good integral skin foams without any problems. Conventional raw materials, formulations, and processing conditions that are the same as or very similar to those employed for CFC-11 blown integral skin foams can be readily used. CFC-11-based formulations for rigid urethane foams and isocyanurate foams can also be used by the direct replacement of the azeotrope blowing agent for CFC-11.

Figure 5:
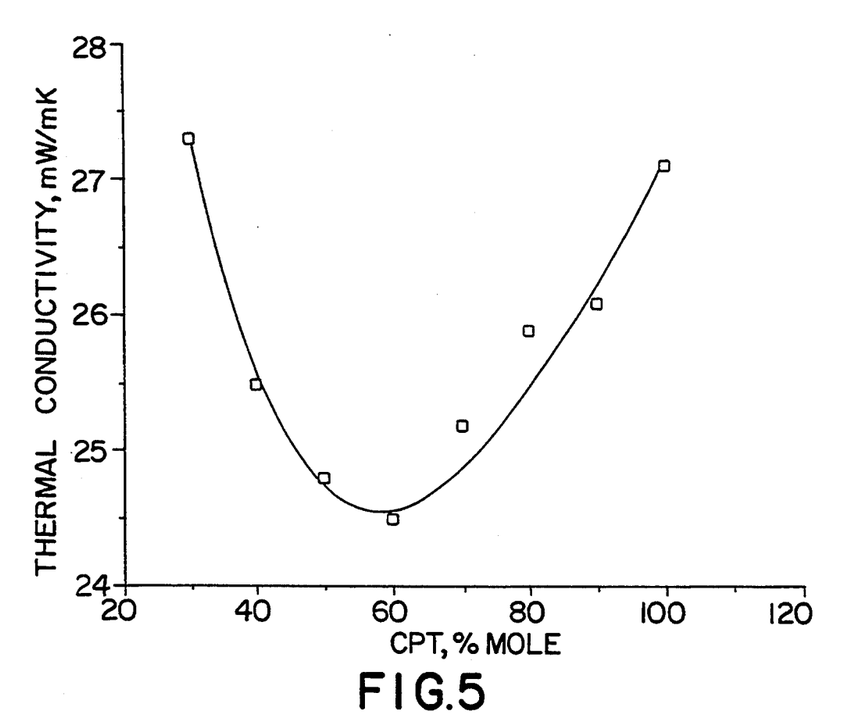
FIG. 5 is a graph presenting an effect of blend ratio on obtained thermal conductivity in milliwatts per meter kelvin [mW/(m.K)] using various blends of cyclopentane (CPT) and methyl formate (MFT)

(4) Another big advantage of the azeotrope blown foams lies in the fact that the resulting foams have lower thermal conductivity than that of respective components of the azeotrope as can be seen in FIG. 5.

(5) Further advantage is the relatively lower cost of azeotrope-based foam systems. In principle, the foam density is proportional to the number of moles of blowing agent employed. The azeotropes contemplated by the present invention have a lesser molecular weight than that of CFC-11 and other fluorinated alternative blowing agents such as HCFCs, HFCs, and PFCs. Therefore, azeotrope-blown foams according to the present invention need a smaller amount of blowing agent to produce comparable foam density. In addition, the unit cost of the azeotrope is less than that of the fluorinated alternative blowing agents.

The isocyanate based polymeric foams prepared in accordance with the present invention are prepared by the substantially simultaneous formation of polyisocyanate-derived polymers and gas generation. The isocyanate based polymeric foams include polyurethane foams, polyurea forms, polyisocyanurate foams, polyoxazolidone foams, polyamide foams, polyimide foams, polycarboiimide foams, and hybrid foams thereof.

Polyurethane foams are prepared by the addition reaction of a polyisocyanate and a polyol in the presence of the presently contemplated halogen-free azeotropic blowing agent, a surfactant, a catalyst, and an additive such as a nucleating agent, if necessary. The choice of polyol and polyisocyanate results in a variety of foam properties, including flexible foams, semi-rigid foams, rigid foams, and others.

Various isocyanate-based polymer foams including polyurethane foams, polyurea foams, modified polyisocyanurate foams, polyoxazolidone foams, polyamide foams, polyimide foams and polycarbodiimide foams have been described by in detail in D. Klempner and K.C. Frisch, eds., *Polymeric Foams,* Chapter 6 by K. Ashida, Hanser Publications (1991).

Polyurea foams are prepared by the reaction of polyisocyanate with amine-terminated polyethers in the presence of the presently contemplated blowing agent, surfactant, and, if necessary, a cross linker and/or a catalyst.

Polyisocyanurate foams can be prepared by the cyclotrimerization of isocyanate groups in the presence of the presently contemplated blowing agent, a cyclotrimerization catalyst, a surfactant and a modifier. The modifier can be at least one of a polyol, a polyepoxide, a polycarboxylic acid, a polyamine, a secondary aromatic diamine, or the like. Urethanmodified isocyanurate foams are the most representative type of the modified isocyanurate foams and are described in U.S. Pat. No. 3,625,872 to Ashida. Polyoxazolidone-modified isocyanurate foams are disclosed in U.S. Pat. No. 3,793,236 to Ashida et al. Polyamide-modified isocyanurate foams are disclosed in French Patent No. 1,511,865. Urea-modified isocyanurate foams are disclosed in Proceedings of the SPI-34th Technical/Marketing Conference, Oct. 21–24, 1992, at p. 331.

Unmodified polyamide foams can be prepared by the reaction of isocyanate groups with carboxylic groupterminated polyester oligomers in the presence of a catalyst, and a surfactant. A blowing agent is not needed because the amide formation is accompanied by the generation of carbon dioxide gas. However, isocyanate-terminated polyesters having amide linkages, i.e., isocyanate-terminated prepolymer, can be used for making foams in the presence of a physical blowing agent of the type contemplated by the present invention, a surfactant, and a catalyst.

Unmodified polyimide foams can be prepared by the reaction of isocyanate-groups with a carboxylic acid dianhydride in the presence of a catalyst, and a surfactant but without a blowing agent, because the imide formation is accompanied with the evolution of carbon dioxide gas. Similarly, polycarbodiimide foams can be prepared by the polycondensation of isocyanate groups with the simultaneous generation of carbon dioxide in the presence of a surfactant and a catalyst. However, isocyanate-terminated linear prepolymers can be further reacted to form carbodiimide foams or carbodiimide-containing isocyanurate foams. These cases need a physical blowing agent, and the presently contemplated blowing agents are eminently well suited for this purpose.

Isocyanate-based hybrid foams include polyurethane-polyisocyanurate foams, polyoxazolidonepolyisocyanurate foams, polyurethane-polyimide foams, polyamide-polyurethane foams, and the like. Examples of isocyanate-based hybrid foams include polyurethane/unsaturated polyester foams, and polyurethane/vinyl ester foams which are described in U.S. Pat. No. 5,091,436 to Frisch.

The polyurethane foam manufacture in general is well known in the art and is described in many books, such as *Polyurethanes, Chemistry and Technology*, Part 1, and Part 2, by J.H. Saunders and K.C. Frisch, Interscience Publishers (1962), *Polyurethane Handbook*, Edited by Guenther Oertel, Carl Hanser Verlag (1985), *The ICI Polyurethane Book*, 2nd Edition, Edited by George Woods, John Wiley & Sons (1990), *Flexible Polyurethane Foams*, Edited by R. Herrington, and Hock, The Dow Chemical Company (1991), *Handbook of Polymeric Foams and Foam Technology*, Edited by D. Klempner and K.C. Frisch, Hanser Publishers (1991).

The isocyanate based polymeric foam systems are composed of at least two components. The azeotrope-containing blowing agent can be added into either component, because of non-reactivity with the ingredients. For example, in the case of urethane foams, the azeotrope-containing blowing agents can be added into either one of the polyol and polyisocyanate components, or into both components.

A nucleating agent can be added to any foam formulation, if desired, for producing foams having relatively finer cells. The amount of nucleating agent that can be added is in a range of about one to ten percent by weight per 100 parts of total foaming ingredients. Some examples of suitable nucleating agents are ultra-fine powders, e.g., 1–5 microns in size, of polyethylene, polypropylene or silica, as well as liquid state nucleating agents, e.g., perfluoroalkanes, such as $C_5F_{12}$, $C_6H_{14}$, $C_7H_{16}$, $C_5H_{11}NO$, which can be emulsified in the foaming ingredients. The resulting foams have very fine cells; therefore, higher insulating properties can be achieved.

The present invention is further illustrated by the examples that follow.

EXAMPLES 1 & 2

Foams were prepared by the cup foaming procedure using a drill mixer. Pure cyclopentane and industrial grade cyclopentane, respectively, were utilized as the blowing agents.

|  | Example 1 | Example 2 |
|---|---|---|
| Formulation (pbw) | | |
| Polyether polyol (a) | 300 | 300 |
| Silicone surfactant (b) | 4.5 | 4.5 |
| t-Amine catalyst (c) | 6.0 | 6.0 |
| Dibutyltin dilaurate | 0.9 | 0.9 |
| Cyclopentane | 16.2 | 0 |
| Industrial grade cyclopentane (d) | 0 | 16.2 |
| Methyl formate | 31.2 | 31.2 |
| Polymeric isocyanate (e) | 271 | 271 |
| Foam Properties | | |
| Density, | | |
| kg/m$^3$ | 34.5 | 31.3 |
| lb/cu.ft. | 2.15 | 1.95 |
| Thermal Conductivity, mW/(m · K) | 24.4 | 24.3 |

Note:
(a) OH No.: 360.
(b) Poly(siloxane-alkylene oxide)
(c) Triethylenediamine-diethylene glycol solution.
(d) 70% cyclopentane, 30% isoprene.
(e) Functionality: 2.7; NCO %: 31.5.

EXAMPLES 3 & 4

Two kinds of cyclopentane-based binary azeotrope were used as blowing agent while preparing foams using the same technique as in Examples 1 and 2, above.

|  | Example 3 | Example 4 |
|---|---|---|
| Formulation (pbw) | | |
| Polyether polyol (a) | 200 | 200 |
| Silicone surfactant (b) | 3.0 | 3.0 |
| t-Amine catalyst (c) | 2.0 | 2.0 |
| Dibutyltin dilaurate | 0.3 | 0.3 |
| Cyclopentane | 28.0 | 22.6 |
| Furan | 6.8 | 0 |
| Methyl acetate | 0 | 13.6 |
| Polymeric isocyanate (d) | 181 | 181 |
| Moles of blowing agent/100 g of polyol | 0.25 | 0.25 |
| Foam Properties | | |
| Density, kg/m$^3$ | 32.6 | 32.5 |
| Thermal Conductivity, mW/(m · K) | 25.1 | 25.8 |

Note:
(a), (b), (c) are the same as in Examples 1 and 2; (d) is the same as (e) in Examples 1 and 2.

Figure 3:
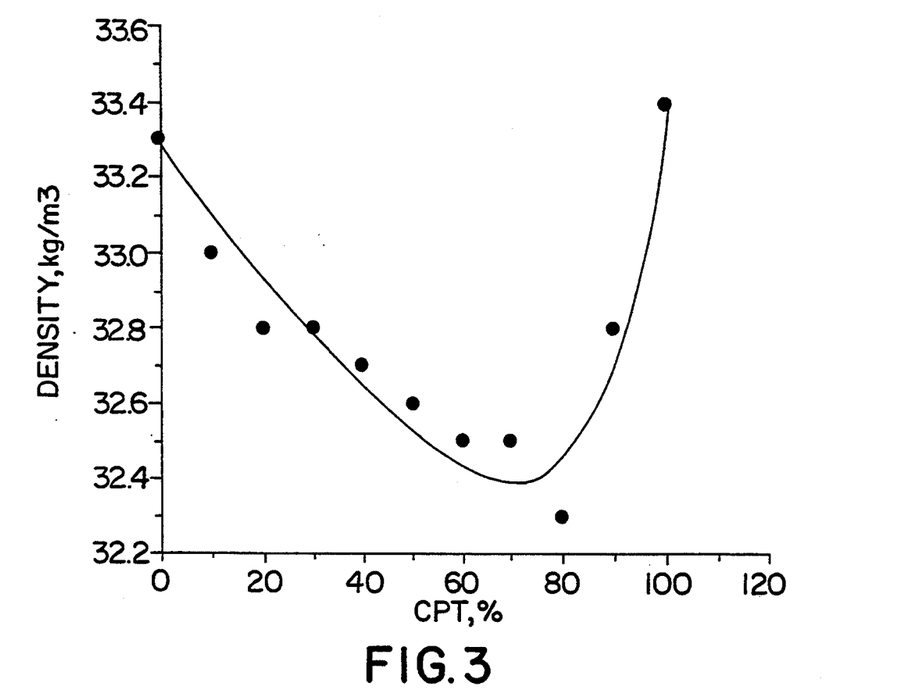
FIG. 3 is a graphical representation of polyurethane foam density as a function of cyclopentane amount when using a cyclopentane (CPT)/furan (FRN) blend as a blowing agent.
Figure 4:
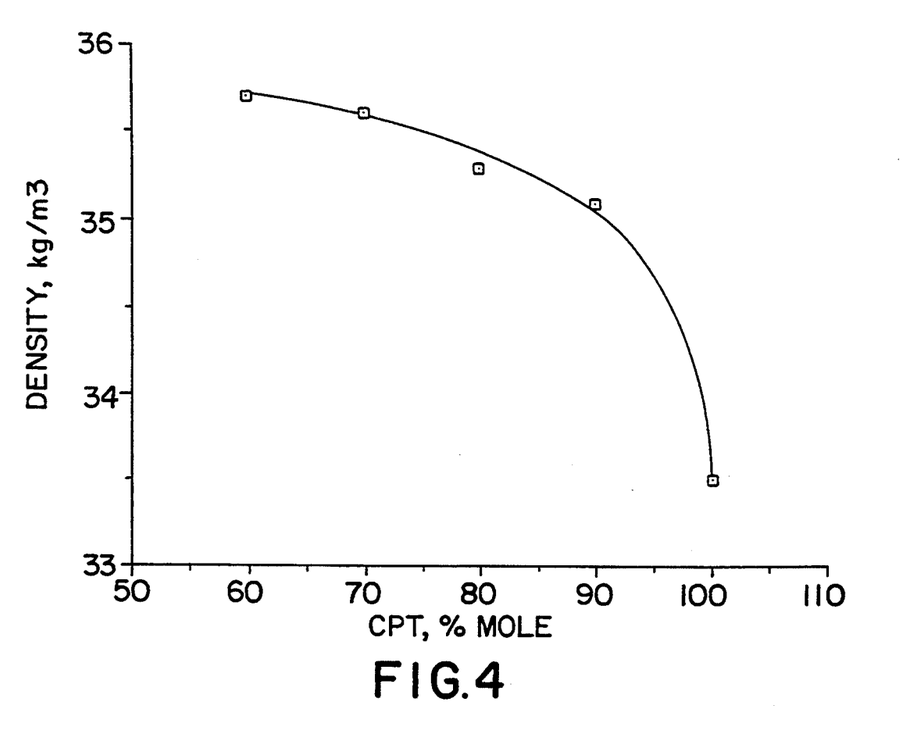
FIG. 4 is a graphical representation of polyurethane foam density as a function of cyclopentane amount when using a cyclopentane (CPT)/acetone (ATN) blend as a blowing agent.

The blend ratio of cyclopentane to furan was varied for a series of experimental runs and the observed density of the produced foams was noted. The total amount of blowing agent was kept constant at 0.25 mole/100 g polyol. These data are presented in FIG. 3.

EXAMPLE 5

Cyclopentene, an unsaturated alicyclic hydrocarbon, was used with methyl acetate as blowing agent while preparing foams using the technique as in Examples 1 and 2, above.

| Formulation (pbw) | |
|---|---|
| Polyether polyol (a) | 100 |
| Silcone surfactant (b) | 1.5 |
| t-Amine catalyst (c) | 2.0 |
| Dibutyltin dilaurate | 0.3 |
| Cyclopentene | 12.6 |
| Methyl acetate | 4.8 |
| Polymeric isocyanate (d) | 90.3 |
| Moles of blowing agent/100 g of polyol | 0.25 |
| Foam Properties | |
| Density, kg/m$^3$ | 30.2 |

Note:
(a), (b), (c) and (d) were the same as in Example 4.

EXAMPLES 6

Foams were prepared at various blend ratios of cyclopentane to methyl formate by the cup foaming technique and using a drill mixer. The following data show the effect of blend ratio of cyclopentane/methyl formate on the density and the thermal conductivity of the resulting foams. The results are also graphically presented in FIGS. 1 and 5. The amount of blowing agent was kept constant at 0.25 mole/100 g of polyol.

| Ratio, CPT/MFT | All CPT | 90/10 | 80/20 | 70/30 | 60/40 | 50/50 | 40/60 | 30/70 | 20/80 |
|---|---|---|---|---|---|---|---|---|---|
| Formulation (pbw) | | | | | | | | | |
| Polyether polyol (a) | 200 | 200 | 200 | 200 | 200 | 200 | 200 | 200 | 200 |
| Silicone surfactant (b) | 3.0 | 3.0 | 3.0 | 3.0 | 3.0 | 3.0 | 3.0 | 3.0 | 3.0 |
| t-Amine catalyst (c) | 2.0 | 2.0 | 2.0 | 2.0 | 2.0 | 2.0 | 2.0 | 2.0 | 2.0 |
| Dibutyltin dilaurate | 0.3 | 0.3 | 0.3 | 0.3 | 0.3 | 0.3 | 0.3 | 0.3 | 0.3 |
| Cyclopentane | 35.0 | 31.5 | 28.0 | 24.6 | 21.0 | 17.6 | 14.0 | 10.6 | 7.0 |
| Methyl formate | 0 | 3.0 | 6.0 | 9.0 | 12.0 | 15.0 | 18.0 | 21.0 | 24.0 |
| Polymeric isocyanate (d) | 181 | 181 | 181 | 181 | 181 | 181 | 181 | 181 | 181 |
| Foam Properties | | | | | | | | | |
| Density, kg/m$^3$ | 31.2 | 30.8 | 30.4 | 30.1 | 29.8 | 29.2 | 28.5 | 29.5 | NA |
| Thermal conductivity, mW/(m · K) | 27.1 | 26.1 | 25.9 | 25.2 | 24.5 | 24.8 | 25.5 | 27.3 | NA |

Note:
(a), (b), (c) and (d) were the same as in Example 4.
NA: not available due to cracked foams.

It was also noted that the thermal conductivity of foams made with cyclopentane/methyl formate azeotrope exhibited a relatively lower thermal conductivity than those made with n-pentane/methyl formate azeotrope as the blowing agent.

EXAMPLES 7

For comparison purposes, foams were prepared at various blend ratios of cyclopentane to acetone by the cup foaming technique and using a drill mixer. The foam formulation is set forth below.

| Ratio, CPT/ATN | All CPT | 90/10 | 80/20 | 70/30 | 60/40 |
|---|---|---|---|---|---|
| Formulation (pbw) | | | | | |
| Polyether polyol (a) | 100 | 100 | 100 | 100 | 100 |
| Silicone surfactant (b) | 1.5 | 1.5 | 1.5 | 1.5 | 1.5 |
| t-Amine catalyst (c) | 2.0 | 2.0 | 2.0 | 2.0 | 2.0 |
| Dibutyl dilaurate | 0.3 | 0.3 | 0.3 | 0.3 | 0.3 |
| Cyclopentane | 17.7 | 15.9 | 14.1 | 12.4 | 10.6 |
| Acetone | 0 | 1.5 | 2.9 | 4.4 | 5.8 |
| Polymeric isocyanate (d) | 90.3 | 90.3 | 90.3 | 90.3 | 90.3 |
| Foam Properties | | | | | |
| Density, | | | | | |
| kg/m$^3$ | 33.5 | 35.1 | 35.3 | 35.6 | 35.7 |
| lbs/cu.ft | 2.09 | 2.19 | 2.20 | 2.22 | 2.23 |

Note:
(a) OH No. 360
(b) Poly(dimethylsiloxane-alkylene oxide)
(c) Triethylenediamine-diethylene glycol solution
(d) Functionality: 2.7, NCO %: 31.5

All foams had cracks. At over 50 mole percent acetone the resulting foams had large cracks, and density determination was difficult.

EXAMPLES 8 & 9

Integral skin foams were prepared as shown below, using an azeotrope blowing agent. Mold size: 200×200×25 mm. Mold temperature: 30° C.

| | Control | Example 8 | Example 9 |
|---|---|---|---|
| Formulation (pbw) | | | |
| Polyol A (a) | 160 | 160 | 160 |
| Polyol B (b) | 50 | 50 | 50 |
| 1,4-Butanediol | 2.0 | 2.0 | 2.0 |
| t-Amine catalyst (c) | 2.2 | 2.2 | 2.2 |
| CFC-11 (d) | 27.4 | 0 | 0 |
| Cyclopentane | 0 | 4.4 | 11.2 |
| Methyl formate | 0 | 8.2 | 0 |
| Furan | 0 | 0 | 2.8 |
| Liquid MDI (e) | 87.0 | 87.0 | 87.0 |
| Foam Properties | | | |
| Average Density, | | | |
| kg/m$^3$ | 297. | 303. | 307. |
| lbs/cu.ft | 18.6 | 19.0 | 19.2 |

Note:
(a) Polyether polyol; Equiv. weight = 1002, functionality = 3
(b) Grafted polyether polyol; Equiv. weight = 2040, functionality = 4
(c) Triethylenediamine-diethylene glycol solution
(d) Trichlorofluoromethane
(e) Carbodiimide-modified MDI Foams having an integral skin with a thickness of about 2 mm were obtained.

EXAMPLE 10

Flexible polyurethane foams were prepared by the conventional cup foaming technique using CFC-11 as control, and a blend of cyclopentane/methyl formate, respectively, as blowing agents.

| | Control | Example 10 |
|---|---|---|
| Formulation (pbw) | | |
| Polyether polyol A (a) | 100 | 100 |
| Silicone surfactant (b) | 2.0 | 2.0 |
| t-Amine catalyst (c) | 0.5 | 0.5 |
| Dibutyltin dilaurate | 0.1 | 0.1 |
| Water | 3.0 | 3.0 |
| CFC-11 | 14.0 | 0 |
| Cyclopentane | 0 | 2.2 |
| Methyl formate | 0 | 4.2 |
| TDI (80/20 isomer) | 40.7 | 40.7 |
| Reaction Profile | | |
| Cream time, sec. | 17 | 16 |
| Rise time, sec. | 98 | 93 |
| Foam Properties | | |
| Density, | | |
| kg/m$^3$ | 20.5 | 22.8 |
| lbs/cu.ft | 1.28 | 1.42 |

Note:
(a) Equiv. weight = 1002, functionality = 3
(b) Poly(dimethylsiloxane-alkylene oxide)
(c) Triethylenediamine-diethylene glycol solution

EXAMPLES 11, 12 & 13

Urethane-modified isocyanurate foams were prepared by the conventional cup foaming technique using a blend of cyclopentane and methyl formate, or HCFC 141b, as blowing agent as indicated below.

|  | Control | Example 11 | Example 12 | Example 13 |
|---|---|---|---|---|
| Formulation (pbw) | | | | |
| NCO/OH (Eq. Ratio) | 5.0 | 5.0 | 10.0 | 15.0 |
| Polyol (a) | 25.3 | 25.3 | 12.9 | 8.57 |
| t-Amine catalyst (b) | 1.6 | 1.6 | 1.6 | 1.6 |
| Silicone surfactant (c) | 0.7 | 0.7 | 0.7 | 0.7 |
| Water | 0.1 | 0.1 | 0.1 | 0.1 |
| HCFC 141b | 14.0 | 0 | 0 | 0 |
| Cyclopentane | 0 | 2.6 | 2.6 | 2.6 |
| Methyl formate | 0 | 5.0 | 5.0 | 5.0 |
| Polymeric isocyanate (d) | 73.7 | 73.7 | 73.7 | 73.7 |
| Reaction Profile | | | | |
| Cream time, sec. | 17 | 18 | 18 | 17 |
| Tack free time, sec. | 32 | 40 | 36 | 32 |
| Rise time, sec. | 55 | 68 | 62 | 57 |
| Foam Properties | | | | |
| Density, | | | | |
| kg/m$^3$ | 26.2 | 26.7 | 29.7 | 27.3 |
| lbs/cu.ft. | 1.64 | 1.67 | 1.85 | 1.70 |
| Tumbling friability, % weight loss | 29.3 | 24.5 | 34.7 | 36.2 |

Note:
(a) Equiv. weight = 239
(b) Triethylenediamine-diethylene glycol solution
(c) Poly(dimethylsiloxane-alkylene oxide)
(d) Polymeric isocyanate; Equivalent ratio = 137

EXAMPLE 14

Figure 6:
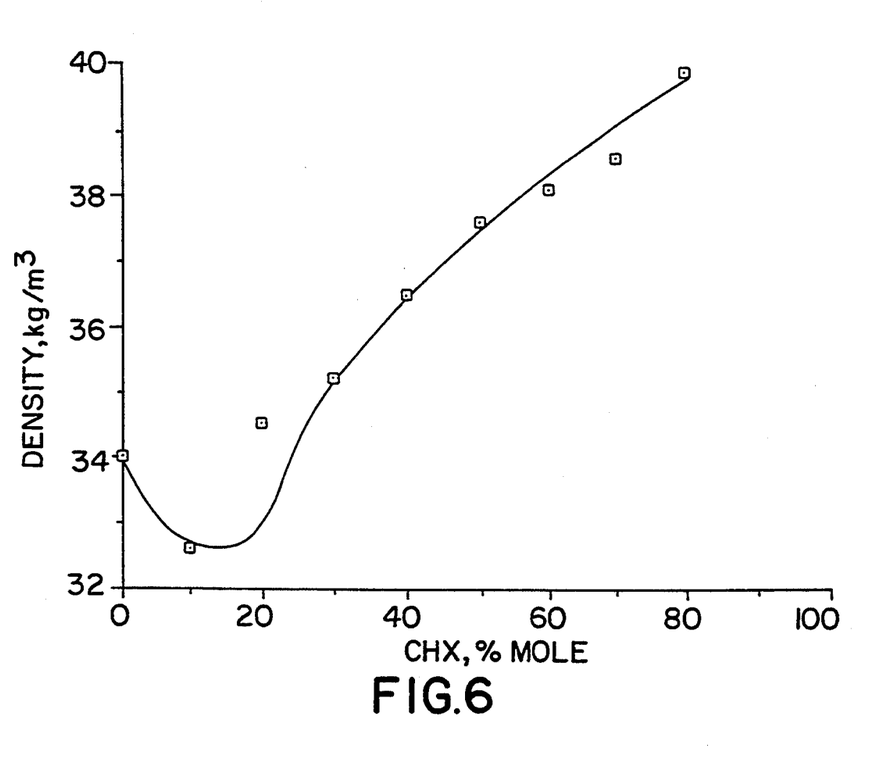
FIG. 6 is a graphical representation of polyurethane foam density as a function of cyclohexane amount when using a cyclohexane (CHX)/methyl formate (MFT) blend as a blowing agent.

Cyclohexane (CHX)/methyl formate (MFT) blends in different blend ratios were used for making foams by the conventional cup foaming technique. The relationship between blend ratio and foam density was noted and is graphically shown in FIG. 6.

| Blend Ratio of CHX/MFT | All CHX | 90/10 | 80/20 | 70/30 | 60/40 | 50/50 | 40/60 | 30/70 | 20/80 | 10/90 | All MFT |
|---|---|---|---|---|---|---|---|---|---|---|---|
| Formulation (pbw) | | | | | | | | | | | |
| Polyether polyol (a) | 50.0 | 50.0 | 50.0 | 50.0 | 50.0 | 50.0 | 50.0 | 50.0 | 50.0 | 50.0 | 50.0 |
| Polyether polyol (b) | 50.0 | 50.0 | 50.0 | 50.0 | 50.0 | 50.0 | 50.0 | 50.0 | 50.0 | 50.0 | 50.0 |
| Silicone surfactant (c) | 1.5 | 1.5 | 1.5 | 1.5 | 1.5 | 1.5 | 1.5 | 1.5 | 1.5 | 1.5 | 1.5 |
| t-Amine (d) | 2.0 | 2.0 | 2.0 | 2.0 | 2.0 | 2.0 | 2.0 | 2.0 | 2.0 | 2.0 | 2.0 |
| Dibutyltin dilaurate | 0.05 | 0.05 | 0.05 | 0.05 | 0.05 | 0.05 | 0.05 | 0.05 | 0.05 | 0.05 | 0.05 |
| Cyclohexane | 21.0 | 18.9 | 16.8 | 14.7 | 12.6 | 10.5 | 8.4 | 6.3 | 4.2 | 2.1 | 0 |
| Methyl formate | 0 | 1.5 | 3.0 | 4.5 | 6.0 | 7.5 | 9.0 | 10.5 | 12.0 | 13.5 | 15.0 |
| Polymeric isocyante (e) | 112.6 | 112.6 | 112.6 | 112.6 | 112.6 | 112.6 | 112.6 | 112.6 | 112.6 | 112.6 | 112.6 |
| Foam Properties | | | | | | | | | | | |
| Density, kg/m$^3$ | NA | NA | 39.9 | 38.6 | 38.1 | 37.6 | 36.5 | 35.2 | 34.5 | 32.6 | 34.0 |
| Density, lbs/cu.ft. | NA | NA | 2.49 | 2.41 | 2.38 | 2.35 | 2.28 | 2.20 | 2.15 | 2.04 | 2.12 |

Note:
(a) Polyether polyol; OH No. = 450, functionality = 6
(b) Polyether polyol; OH No. = 400, functionality = 3
(c) Poly(dimethylsiloxane-alkylene oxide)
(d) Triethylenediamine-diethylene glycol solution
(e) NCO % = 31.0

The foregoing description and the examples are intended as illustrative and are not to be taken as limiting. Still other variations within the spirit and scope of this invention are possible and will readily present themselves to those skilled in the art.

I claim:

1. A process of making an isocyanate-based polymeric foam characterized by the use of a halogenfree organic liquid as a physical blowing agent for said foam; said organic liquid containing a positive azeotrope having a minimum boiling temperature in the range of about 15° C. to about 80° C. at normal atmospheric pressure and constituted by a cycloaliphatic hydrocarbon containing at least 5 but no more than 7 carbon atoms and a compound selected from the group consisting of an aliphatic ether containing 4 carbon atoms, an aliphatic carboxylic acid ester containing at least 2 but no more than 5 carbon atoms, an aliphatic ketone containing 4 carbon atoms, and mixtures thereof.

2. The process in accordance with claim 1 wherein the foam is a polyurethane foam.

3. The process in accordance with claim 1 wherein the foam is a rigid polyurethane foam.

4. The process in accordance with claim 1 wherein the foam is an integral skin, flexible polyurethane foam.

5. The process in accordance with claim 1 wherein the foam is a modified isocyanurate foam.

6. The process in accordance with claim 1 wherein the foam is a urethane-modified polyisocyanurate foam.

7. The process in accordance with claim 1 wherein said azeotrope has a minimum boiling temperature in the range of about 15° C. to about 45° C.

8. The process in accordance with claim 1 wherein said azeotrope has a minimum boiling temperature in the range of about 20° C. to about 40° C.

9. The process in accordance with claim 1 wherein the cycloaliphatic hydrocarbon is cyclopentane.

10. The process in accordance with claim 1 wherein the azeotrope is a blend of cyclopentane and methyl formate.

11. The process in accordance with claim 1 wherein the azeotrope is a blend of cyclopentane and 2-butanone.

12. The process in accordance with claim 1 wherein the azeotrope is a blend of cyclopentane and furan.

13. The process in accordance with claim 1 wherein the azeotrope is a blend of cyclopentane and methyl acetate.

14. The process in accordance with claim 1 wherein the cycloaliphatic hydrocarbon is cyclopentene.

15. The process in accordance with claim 1 wherein the cycloaliphatic hydrocarbon is cyclohexane.

16. The process in accordance with claim 1 wherein the cycloaliphatic hydrocarbon is cyclohexene.

17. A process of making an isocyanate-based polymeric foam which comprises foaming by action of a halogen-free blowing agent which is a positive azeotrope having a minimum boiling temperature in the range of about 15° C. to about 80° C. at normal atmospheric pressure and constituted by a cycloaliphatic hydrocarbon containing at least 5 but no more than 7 carbon atoms and an aliphatic carboxylic acid ester containing at least 2 but no more than 5 carbon atoms.

18. The process in accordance with claim 17 wherein said positive azeotrope is constituted by cyclopentane and methyl formate.

19. The process in accordance with claim 17 wherein said positive azeotrope is constituted by cyclopentane and ethyl formate.

20. The process in accordance with claim 17 in which said positive azeotrope is constituted by cyclopentane and methyl acetate.

21. The process in accordance with claim 17 in which said positive azeotrope is constituted by cyclohexane and methyl formate.

22. A process of making an isocyanate-based polymeric foam which comprises foaming by action of a halogen-free blowing agent which is a positive azeotrope having a minimum boiling temperature in the range of about 15° C. to about 80° C. and constituted by a cycloaliphatic hydrocarbon containing at least 5 but no more than 7 carbon atoms and an aliphatic ketone containing 4 carbon atoms.

23. The process in accordance with claim 22 wherein said positive azeotrope is constituted by cyclohexane and 2-butanone.

24. The process in accordance with claim 22 wherein said positive azeotrope is constituted by cyclohexene and 2-butanone.

25. The process in accordance with claim 22 wherein said positive azeotrope is constituted by cyclopentane and 2-butanone.

26. The process in accordance with claim 22 wherein said positive azeotrope is constituted by cyclopentene and 2-butanone.

27. A process of making an isocyanate-based polymeric foam which comprises foaming by action of a halogen-free blowing agent which is a positive azeotrope having a minimum boiling temperature in the range of about 15° C. to about 80° C. at normal atmospheric pressure and constituted by a cycloaliphatic hydrocarbon containing at least 5 but no more than 7 carbon atoms and an aliphatic ether containing 4 carbon atoms.

28. The process in accordance with claim 27 wherein said positive azeotrope is constituted by cyclopentane and furan.

29. The process in accordance with claim 1 wherein a nucleating agent is also present during foaming.

30. The process in accordance with claim 29 wherein the nucleating agent is perfluoropentane.

31. The process in accordance with claim 29 wherein the nucleating agent is present in an amount in the range of about 1 to about 10 parts by weight per 100 parts of said foaming ingredients.

32. The process in accordance with claim 1 wherein the weight ratio of azeotropic constituents in said organic liquid is within a deviation range of about +/− 20 percent from ideal azeotrope.

33. The process in accordance with claim 1 wherein the weight ratio of azeotropic constituents in said organic liquid is within a deviation range of no more than about +/− 10 percent from ideal azeotrope.

34. The process in accordance with claim 1 wherein the weight ratio of azeotropic constituents in said organic liquid is within a deviation range of no more than about +/− 5 percent from ideal azeotrope.

* * * * *